(12) United States Patent
Tsen

(10) Patent No.: US 11,473,607 B2
(45) Date of Patent: Oct. 18, 2022

(54) SELF-TAPPING SCREW

(71) Applicant: Chi-Yu Tsen, Kaohsiung (TW)

(72) Inventor: Chi-Yu Tsen, Kaohsiung (TW)

( * ) Notice: Subject to any disclaimer, the term of this patent is extended or adjusted under 35 U.S.C. 154(b) by 256 days.

(21) Appl. No.: 17/067,767

(22) Filed: Oct. 12, 2020

(65) Prior Publication Data

US 2021/0108665 A1    Apr. 15, 2021

(30) Foreign Application Priority Data

Oct. 14, 2019   (TW) .................................. 108136874

(51) Int. Cl.
  *F16B 35/04*    (2006.01)
  *F16B 25/00*    (2006.01)

(52) U.S. Cl.
  CPC ...... *F16B 25/0057* (2013.01); *F16B 25/0047* (2013.01); *F16B 25/0073* (2013.01)

(58) Field of Classification Search
  CPC .......................... F16B 25/0047; F16B 25/0057
  USPC ........................................ 411/411, 412, 263
  See application file for complete search history.

(56) References Cited

U.S. PATENT DOCUMENTS

| | | | | |
|---|---|---|---|---|
| 3,643,543 A * | 2/1972 | Gutshall | ............. | F16B 25/0047 411/418 |
| 5,120,171 A * | 6/1992 | Lasner | ................. | A61B 17/863 606/317 |
| 6,000,892 A * | 12/1999 | Takasaki | ............. | F16B 25/0015 411/413 |
| 9,784,297 B2 * | 10/2017 | Lard | .................... | F16B 25/0021 |
| 2004/0081535 A1 * | 4/2004 | Birkelbach | ......... | F16B 25/0047 411/411 |
| 2007/0128001 A1 * | 6/2007 | Su | ......................... | F16B 35/041 411/413 |
| 2007/0172333 A1 * | 7/2007 | Tsau | .................... | F16B 25/0031 411/378 |
| 2009/0097942 A1 * | 4/2009 | Weiss | .................. | F16B 25/0057 411/416 |
| 2015/0010375 A1 * | 1/2015 | Schraer | ............... | F16B 25/0073 411/414 |
| 2015/0247519 A1 * | 9/2015 | Call | .................... | F16B 25/0073 411/403 |
| 2015/0305463 A1 * | 10/2015 | Huyke-Phillips | ....... | B29C 44/12 112/475.08 |
| 2016/0003283 A1 * | 1/2016 | Call | .................... | F16B 25/0057 411/386 |
| 2020/0271151 A1 * | 8/2020 | Hsu | ..................... | F16B 25/0068 |

* cited by examiner

*Primary Examiner* — Gary W Estremsky
(74) *Attorney, Agent, or Firm* — Leong C. Lei

(57) ABSTRACT

A self-tapping screw includes a head portion, a lower side thereof configured with a screw rod, a front end thereof configured with a drill tail, a first thread segment formed on a front end of the screw rod above the drill tail, a second thread segment with at least two threads formed on a rear end of the screw rod immediately below the head portion, a crest angle of any one of the threads of the second screw segment being 1.15 to 1.2 times of a crest angle of any thread of the first thread segment, and a thread root diameter of the second thread segment increasing proportionally with the crest angle of the second thread segment. Whereby, the present invention provides a self-tapping screw capable of tight locking without idling.

1 Claim, 4 Drawing Sheets

SELF-TAPPING SCREW

(a) TECHNICAL FIELD OF THE INVENTION

The present invention relates to a self-tapping screw, and more particularly to a self-tapping screw that can be tightly locked on a thin plate without idling.

(b) DESCRIPTION OF THE PRIOR ART

In current architecture and automobile industries, many metal thin plates are used to build or assemble into building, roof walls, large machinery, automobiles, and etc. because they have the advantages of light weigh and lower cost, and self-tapping screws are used to couple the metal thin plates to buildings, steel connection members or supports. As FIG. 1 shows, a conventional self-tapping screw 10 used to lock on a thin plate includes a head portion 11, on the lower side of which is configured with a screw rod 12, on the bottom end of which is provided with a drill tail 13. Whereby, the drill tail 13 can be used to drill a thin plate 20, and then continue to be locked in, so that the screw rod 12 can be screw-locked with the thin plate 20.

However, since the crest angle θ of each screw thread provided on the screw 12 of the self-tapping screw 10 is the same, a screw hole 21 formed on the thin plate 20 will expand after the rotating and tapping of the front part of screw rod 12 as FIG. 2 shows. In addition, the thickness of the thin plate 20 always is smaller than the thread pitch of the screw rod 12, it is easy to cause the self-tapping screw 10 to idle after the self-tapping screw 10 is screwed to the end so that the head portion 11 is in contact with the thin plate, and the thread of the screw rod 12 cannot be screwed and combined with the thin plate 20. As a result, the thin plate 20 and the support cannot be locked in a fixed position, so that the thin plate 20 and the self-tapping screw 10 will shake; when the thin plate 20 is acted by external force such as strong wind, it will even be separated from the support together with the self-tapping screws 10, which will further cause danger and endanger personal safety.

SUMMARY OF THE INVENTION

To overcome the above disadvantages, the present invention is proposed. One object of the present invention is to provide a self-tapping screw, capable of tight locking without idling.

To achieve the above object, the present invention proposes a self-tapping screw, including a head portion, a lower side thereof configured with a screw rod, a front end thereof configured with a drill tail, a first thread segment formed on a front end of the screw rod above the drill tail, a second thread segment with at least two threads formed on a rear end of the screw rod immediately below the head portion, a crest angle of any one of the threads of the second screw segment being 1.15 to 1.2 times of a crest angle of any thread of the first thread segment, and a thread root diameter of the second thread segment increasing proportionally with the crest angle of the second thread segment.

Whereby, the present invention provides a self-tapping screw capable of tight locking without idling.

DETAILED DESCRIPTION OF THE PREFERRED EMBODIMENTS

Figure 1:
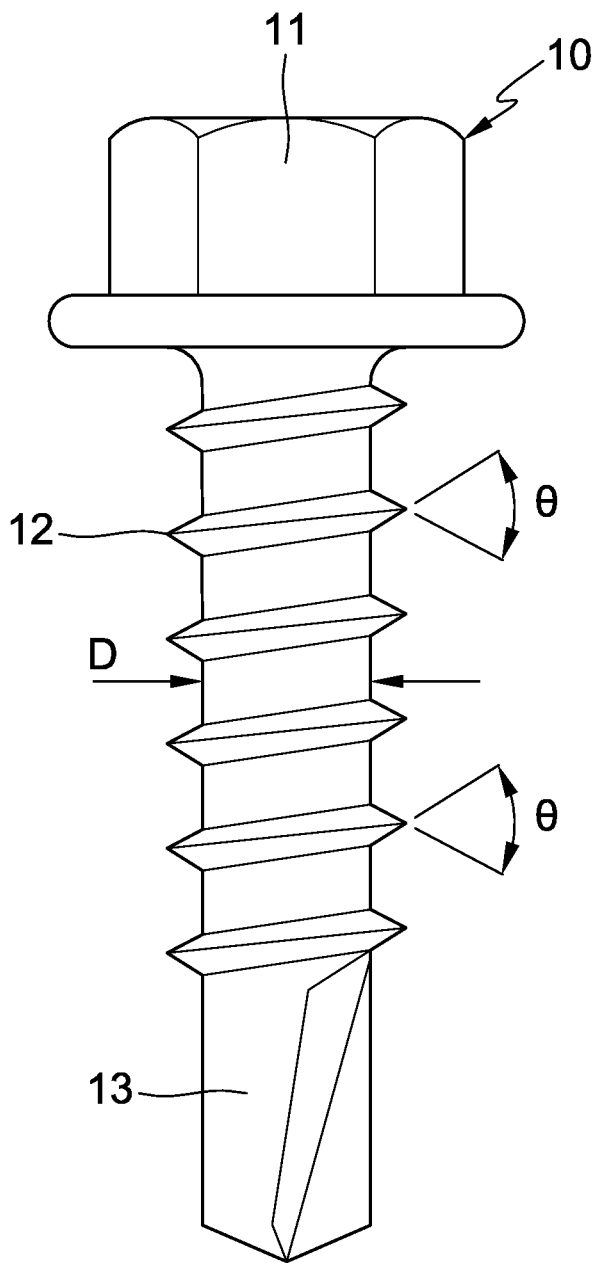
FIG. 1 is a side view of a conventional self-tapping screw.
Figure 2:
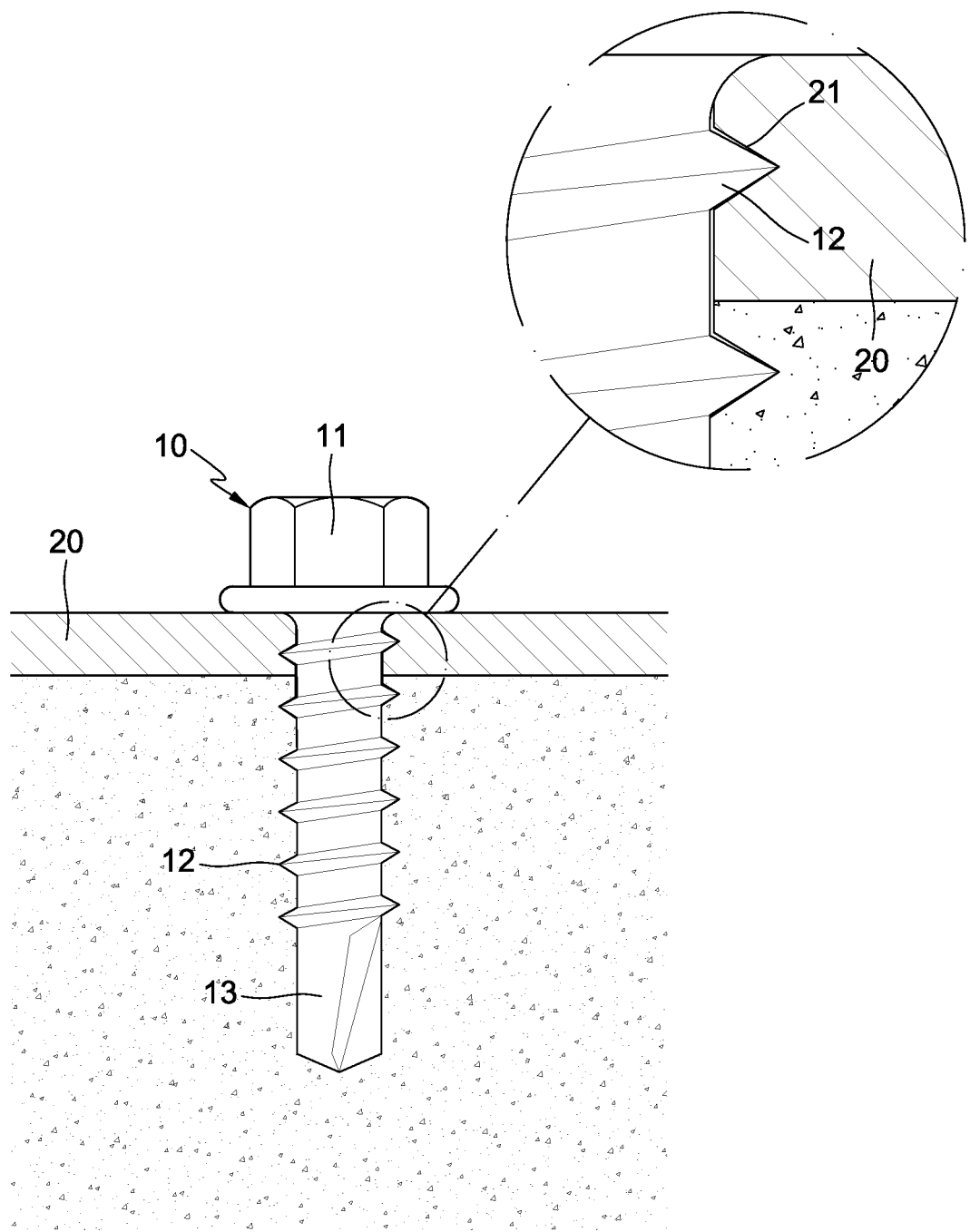
FIG. 2 is a side view of a conventional self-tapping screw and a schematic view of it locked to a thin plate and support.
Figure 3:
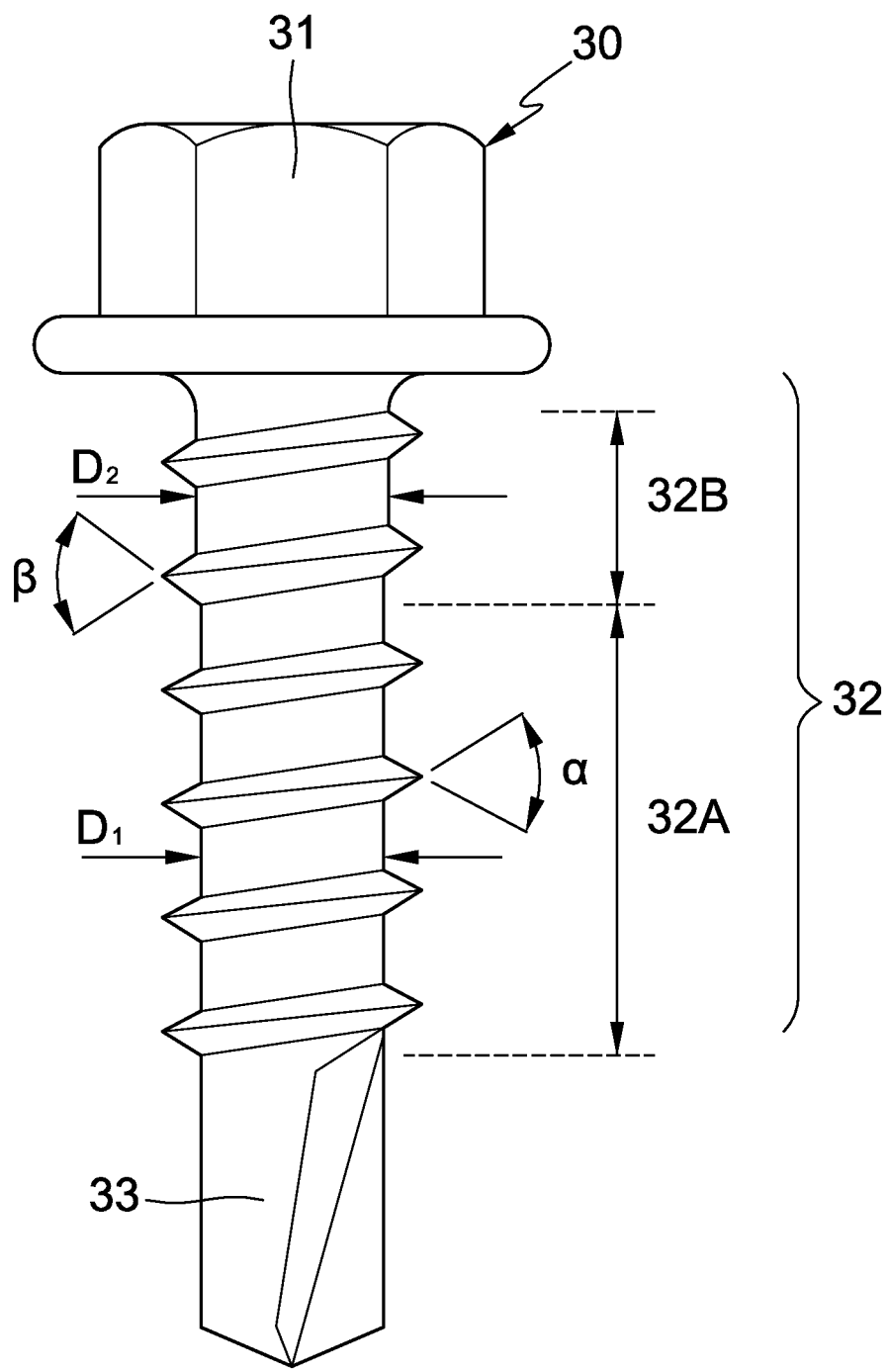
FIG. 3 is a side view of a self-tapping screw of the present invention.

Referring to FIG. 3, a self-tapping screw 30 of the present invention includes a head portion 31, the lower side of which is configured with a screw rod 32, the front end of which is provided with a drill tail 33, where the lower part of the screw rod 32 is formed into a first thread segment 32A and the rear end of the screw rod 32 with at least two threads (that is, one pitch) immediately below the head portion 31 a second thread segment 32B, where the crest angle of each thread of the first thread segment 32A is α, and the crest angle of each thread of the second thread segment 32B is β; the thread root diameter of the first segment 32A is $D_1$, and the thread root diameter of the second segment 32B is $D_2$; the crest angle β of each thread of the first thread segment 32B is 1.15 to 1.2 times of the crest angle α of each thread of the first thread segment 32A, and the thread root diameter $D_2$ of the second segment 32B is 1.15 to 1.2 times of the thread root diameter $D_1$ of the first thread segment 32A. Furthermore, the present invention makes the thread root diameter $D_2$ of the second thread segment 32B increase proportionally with the crest angle β of each thread of the second thread segment 32B.

In a preferred embodiment, when the crest angle α of each thread of the first thread segment 32A is 60°, and the crest angle β of each thread of the second thread segment 32B is 70° to meet the best screw locking angle.

Figure 4:
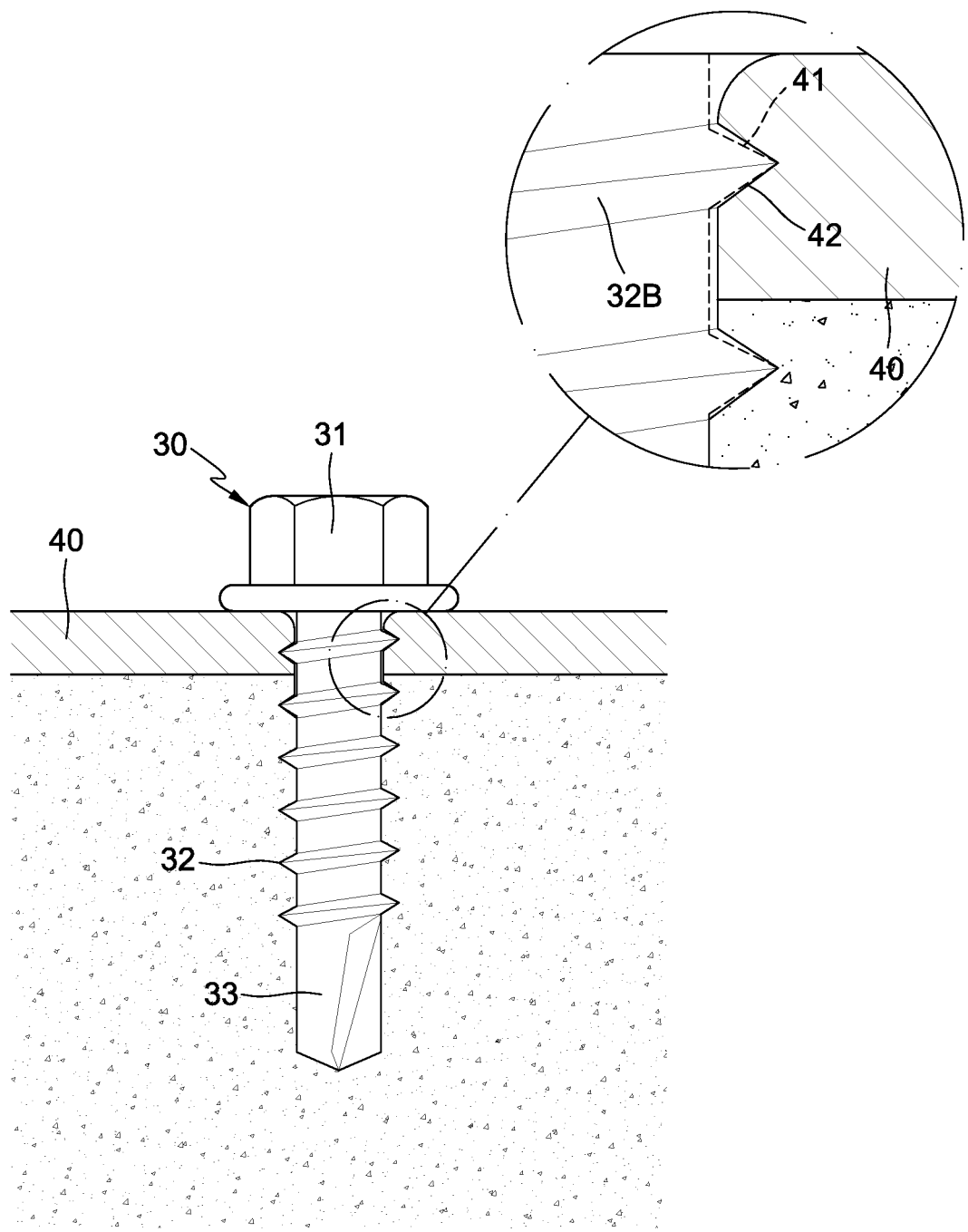
FIG. 4 is a side view of the self-tapping screw of the present invention, and a schematic view of it locked to a thin plate and support.

With the above structure, the first thread segment 32A of the screw rod 32 drills and taps to form a screw hole 41 after the self-tapping screw 30 of the present invention uses the drill tail 33 to tap into the thin plate 40, as FIG. 4 shows. Thereafter, the self-tapping screw 30 continues to tap, allowing the second thread segment 32B to be locked on the thin plate 40. At this time, since the crest angle β and thread root diameter $D_2$ of the second thread segment 32B respectively are 1.15 to 1.2 times of the crest angle α and thread root diameter $D_1$, the second thread segment 32B can be tightly locked to the screw hole 41 of the thin plate 40 to form a larger screw hole 42, thereby making the second thread segment 32B tightly locked on the thin plate 40.

Specifically, the screw hole 41 will be slightly expanded after the thin plate 40 is continuously drilled and tapped for a period of time by the first thread segment 32A of the self-tapping screw 30 of the present invention. Thereafter, since the second thread segment 32B is configured on the end of the screw rod 32, and both the crest angle β and thread root diameter $D_2$ of the second thread segment 32B are larger, the second thread segment 32B is allowed to tightly lock the screw hole 41 of the thin plate 40 to form the larger screw hole 42, so that the area of the second thread segment 32B in contact with the screw hole 42 is increased, and the second thread segment 32B is further caused to be directly tightly combined with the screw hole 42, allowing the self-tapping screw 30 of the present invention to be accurately locked and fixed with the thin plate 40; when the self-tapping screw 30 is screwed in to the bottom, the self-tapping screw 30 will not run idle and will not be unable to be locked, and even if the thickness of the thin plate 40 is smaller than the pitch of the screw rod 32 of the present invention, the self-tapping screw 30 of the present invention can be accurately effectively locked and positioned on the thin plate 40 through the tight combination of the second thread segment 32B and screw hole 42.

Therefore, it can be known from the above that the self-tapping screw of the present invention has inventive step, the structure and method thereof are indeed unprecedented, so that it has met the requirements of an invention patent.

I claim:

1. A self-tapping screw, comprising a head portion, a lower side thereof configured with a screw rod, a front end thereof configured with a drill tail, a first thread segment formed on a front end of said screw rod above said drill tail, a second thread segment with at least two threads formed on a rear end of said screw rod immediately below said head portion, a crest angle of any one of said threads of said second screw segment being 1.15 to 1.2 times of a crest angle of any thread of said first thread segment, and a thread root diameter of said second thread segment increasing proportionally with said crest angle of said second thread segment.

* * * * *